US010688450B2

(12) United States Patent
Rueter

(10) Patent No.: US 10,688,450 B2
(45) Date of Patent: Jun. 23, 2020

(54) SYSTEM AND METHOD FOR GAS IMPREGNATION OF A LIQUID

(71) Applicant: Espresso Amore, Las Vegas, NV (US)

(72) Inventor: Robert Rueter, Las Vegas, NV (US)

(73) Assignee: Espresso Amore, Las Vegas, NV (US)

( * ) Notice: Subject to any disclaimer, the term of this patent is extended or adjusted under 35 U.S.C. 154(b) by 257 days.

(21) Appl. No.: 15/650,623

(22) Filed: Jul. 14, 2017

(65) Prior Publication Data

US 2018/0015431 A1 Jan. 18, 2018

Related U.S. Application Data

(60) Provisional application No. 62/362,237, filed on Jul. 14, 2016.

(51) Int. Cl.
*B01F 3/04* (2006.01)
*B01F 15/04* (2006.01)
(Continued)

(52) U.S. Cl.
CPC .......... *B01F 3/04787* (2013.01); *A23L 2/00* (2013.01); *A23L 2/44* (2013.01); *B01F 3/0446* (2013.01);
(Continued)

(58) Field of Classification Search
CPC .............. B01F 3/04787; B01F 3/04262; B01F 3/0446; B01F 3/04808; B01F 3/04815;
(Continued)

(56) References Cited

U.S. PATENT DOCUMENTS 2,314,983 A * 3/1943 Hudson ............... B01F 3/04808
137/202
3,608,779 A * 9/1971 Cornelius .............. A23G 9/045
222/54
(Continued)

FOREIGN PATENT DOCUMENTS

WO 2014169198 10/2014
WO 2016164796 10/2016

OTHER PUBLICATIONS

Product listing by "Midwest Homebrewing and Winemaking Supplies" for "Carbonating Stone with 1/4" Barb, 0.5 micron" on amazon.com—https://www.amazon.com/Carbonating-Stone-Barb-0-5-micron/dp/B00640KB00/ref=cm_rdp_product Last Viewed Nov. 27, 2017.

*Primary Examiner* — Anthony J Weier
(74) *Attorney, Agent, or Firm* — Dickinson Wright, PLLC; James P. Purrington, Jr.

(57) ABSTRACT

A system for gas impregnation of a liquid includes a container for holding a product ingredient, a first still liquid conduit for conveying a still product including the ingredient, a gas cylinder providing a gas conduit with a compressed gas such as Nitrogen. The system includes two or more pressure chambers each having a corresponding liquid fill valve to control the flow of a still product filling the pressure chamber, and a gas diffuser for diffusing the compressed gas into the still product to produce a gas infused product. A multi-way valve in fluid communication with each of the pressure chambers directs the gas infused product from a selected one of the pressure chambers to a first charged product conduit for supplying a charged liquid dispenser, and blocks fluid from flowing from other, non-selected, ones of the pressure chambers. A method for using the subject system is also provided.

22 Claims, 1 Drawing Sheet

(51) Int. Cl.
*A23L 2/44* (2006.01)
*A23L 2/00* (2006.01)
*C12H 1/14* (2006.01)
*B67D 1/00* (2006.01)
*B67D 1/04* (2006.01)

(52) U.S. Cl.
CPC ...... B01F 3/04262 (2013.01); B01F 3/04808 (2013.01); B01F 3/04815 (2013.01); B01F 15/0429 (2013.01); B67D 1/0072 (2013.01); C12H 1/14 (2013.01); *B01F 2003/04921* (2013.01); *B67D 1/0021* (2013.01); *B67D 2001/0487* (2013.01)

(58) Field of Classification Search
CPC ....... B01F 15/0429; B01F 2003/04921; B57D 1/0072; B67D 1/0021; B67D 2001/0487
See application file for complete search history.

(56) References Cited

U.S. PATENT DOCUMENTS

| | | | |
|---|---|---|---|
| 3,780,198 A * | 12/1973 | Pahl et al. | A23L 2/54 426/477 |
| 6,234,349 B1 * | 5/2001 | Bilskie | B67D 1/006 222/129.2 |
| 9,497,978 B2 | 11/2016 | Choi et al. | |
| 9,623,383 B1 * | 4/2017 | Kleinrichert | B01F 3/04808 |
| 2003/0173376 A1 * | 9/2003 | Bilskie | B67D 1/0406 222/129.1 |
| 2006/0168999 A1 * | 8/2006 | Fisher | A23L 3/3409 62/606 |
| 2006/0231574 A1 | 11/2006 | Bilskie et al. | |
| 2015/0329343 A1 | 11/2015 | Kleinrchert | |
| 2016/0325977 A1 | 11/2016 | Peirsman et al. | |
| 2017/0120204 A1 * | 5/2017 | Tipton | A23L 2/54 |

* cited by examiner

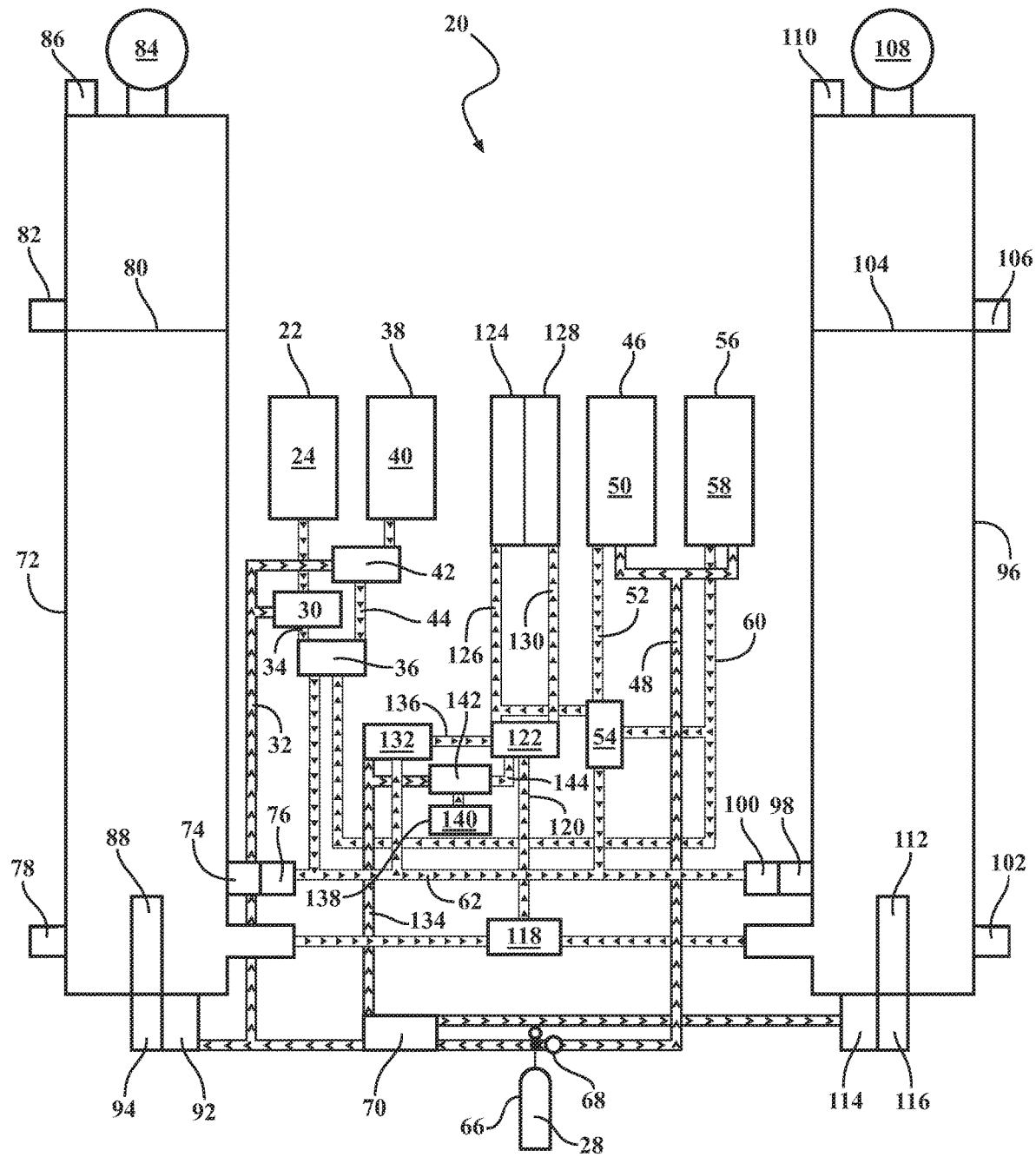

SYSTEM AND METHOD FOR GAS IMPREGNATION OF A LIQUID

CROSS REFERENCE TO RELATED APPLICATION

This application claims the benefit of application Ser. No. 62/362,237, filed Jul. 14, 2016, which is hereby incorporated by reference in its entirety.

BACKGROUND

1. Field of the Invention

This disclosure relates generally to gas impregnation of liquids, and to methods for producing same. In particular, the present disclosure relates to a system and method for adding a compressed gas to a concentrated or ready-to-drink beverage such as coffee or beer.

2. Description of the Prior Art

Known systems for gas impregnation of liquids generally do such impregnation using large batch tanks which are unable to accommodate a consistent delivery of the gas impregnated liquid. Examples of such known gas impregnation systems include beverage dispensing systems, which are popular for dispensing drinks such as coffee and beer to a customer, either in a commercial or residential setting. These conventional systems, however, have several disadvantages. For example, typically these systems mix beverages in uncooled lines, or fail to sense or dispense the proper amount of gas or beverage product to the user. This may also result in a less than ideal final beverage product. Additionally, known beverage dispensing systems lack the ability to quickly combine one or more flavor additives to the final beverage product at the desire of the user. Known systems for producing and dispensing gas infused liquids can also fail to deliver a consistent and reliable or uninterrupted source of the gas infused product and may result in several inefficiencies. For example, transporting and storing large batches of gas impregnated liquids requires special, pressurized, containers which often must be returned to be refilled. A system that can provide for an on-demand gas infused liquid using ingredients would provide several benefits and potential cost savings.

SUMMARY

A system for gas impregnation of a liquid comprises a container for holding a product ingredient, which may be a still, or non-gas infused, product, a first still liquid conduit for conveying a still product including the ingredient, a gas cylinder providing a gas conduit with a compressed gas. A first liquid fill valve controls flow of the still product into a first pressure chamber containing a first gas diffuser, having a porous structure, for diffusing the compressed gas into the still product to produce a gas infused product. A second liquid fill valve controls flow of the still product into a second pressure chamber containing a second gas diffuser having a porous structure for diffusing the compressed gas into the still product to produce the gas infused product. A multi-way valve in fluid communication with each of the pressure chambers directs the gas infused product from a selected one of the pressure chambers to a first charged product conduit for supplying a charged liquid dispenser, and blocks fluid from flowing from a non-selected one of the pressure chambers.

A method for a gas impregnation of a liquid is also provided which comprises the steps of: opening a first liquid fill valve to fill a first pressure chamber with a predetermined volume of a still product; closing the first liquid fill valve to cease filling the first pressure chamber with the still product; charging the first pressure chamber by opening a first gas fill valve to cause a compressed gas to flow through a first gas diffuser and to infuse into the still product to produce a gas infused product in the first pressure chamber; filling a second pressure chamber with a predetermined volume of the still product by opening a second liquid fill valve; closing the second liquid fill valve to cease filling the second pressure chamber; and charging the second pressure chamber by opening a second gas fill valve to cause the compressed gas to flow through a second gas diffuser and to infuse into the still product to produce a gas infused product in the second pressure chamber. The method may proceed with the steps of directing by a multi-way valve the gas infused product from an operational one of the pressure chambers into a first charged product conduit to be discharged while blocking the flow of liquid from the other one of the pressure chambers to the first charged product conduit; switching by the multi-way valve in response to the liquid level in the operational one of the pressure chambers having dropped below the associated low operating level and to cause the other one of the pressure chambers to be directed to the first charged product conduit, and thereby swapping the one of the pressure chambers functioning as the operational one of the pressure chambers; and supplying a charged liquid dispenser with the gas infused product from the multi-way valve.

DESCRIPTION OF THE DRAWINGS

Other advantages of the present invention will be readily appreciated, as the same becomes better understood by reference to the following detailed description when considered in connection with the accompanying drawings wherein:

FIG. 1 is a schematic diagram of a system for gas impregnation of a liquid.

DETAILED DESCRIPTION

Referring to the Figures, wherein like numerals indicate corresponding parts throughout the several views, a system 20 and method for gas impregnation of a liquid is provided.

As shown in FIG. 1, the system 20 may include one or more containers holding product ingredients 140, 24, 40, 50, 58 which may include a first vessel 22 for holding a first ingredient 24 to be metered into a solution prior to being impregnated with a compressed gas 28. The first ingredient 24 may be, for example, water or coffee. A first pump 30 may be provided for pumping the first ingredient 24 through a first liquid conduit 34 from the first vessel 22 to a first mixing valve 36. The containers may also include a second vessel 38 for holding a second ingredient 40 to be dispensed without first being mixed into a solution. The second ingredient 40 may be, for example, a ready-to-use potency ingredient such as coffee or tea or a concentrated ingredient to be diluted into a solution prior to being dispensed. A second pump 42 may be provided for pumping the second ingredient 40 through a second liquid conduit 44 from the first vessel 22 to the first mixing valve 36. The first pump 30 and/or the second pump 42 may be powered by a compressed gas 28 supplied by a first gas conduit 32, however, other types of pumps 132, 142, 30, 42 may be used such as electric or air powered pumps 132, 142, 30, 42. The first vessel 22 and the second vessel 38 may each be maintained at an ambient pressure and may be, for example, bag-in-box type containers.

The system 20 may include a third vessel 46 for holding a third ingredient 50 to be metered into a solution prior to being impregnated with a dissolved gas, with a third liquid conduit 52 in fluid communication with the third vessel 46 for conveying the third ingredient 50 to a second mixing valve 54. The system 20 may also include a fourth vessel 56 for holding a fourth ingredient 58, with a fourth liquid conduit 60 in fluid communication with the fourth vessel 56 for conveying the fourth ingredient 58 to the second mixing valve 54. The third and fourth vessels 46, 56 may be the primary and secondary sources of the ingredients of the still product. In other words, the system 20 may operate only from one or both of the third and fourth vessels 46, 56 and may include no unpressurized vessels. The third and fourth ingredients may each be ready-to-use potency ingredients or concentrated ingredients. One or more of the vessels 138, 22, 38, 46, 56 may be operable at an elevated pressure and connected to a second gas conduit 48 conveying the compressed gas 28 thereto. The mixing valves 36, 54 may comprise one or more physical devices and may also include a mechanical or digital blending system 20 which may allow the blending of varying amounts of the ingredients 24, 40, 50, 58. A first still liquid conduit 62 may be in fluid communication with each of the mixing valves 36, 54 for conveying a still product from at least one of the mixing valves 36, 54. A still product is defined as a liquid containing no dissolved gas or a negligible to low amount of dissolved gas.

The product ingredients 140, 24, 40, 50, 58 may include any liquid, such as a hard or soft drink beverage, such as, for example, coffee, tea, or beer, or a component thereof such as water or concentrated syrup. One or more of the product ingredients 140, 24, 40, 50, 58 may be additives such as flavorings or sweeteners that may be added to the liquid before or after the liquid is infused with the compressed gas 28. Any number of ingredients may be combined prior to gas impregnation to achieve desired results. The subject system may be used with other liquids such as, for example, fuels, lubricants, coolants, or food products.

As shown in FIG. 1, the system 20 may further include a gas cylinder 66 containing the compressed gas 28 and in fluid communication with a primary regulator 68 for reducing the pressure and providing the second gas conduit 48 with the compressed gas 28. A secondary regulator 70 may also be provided in fluid communication with the gas cylinder 66 for reducing the pressure therefrom and for providing the first gas conduit 32 with the compressed gas 28. The secondary regulator 70 may be connected downstream of the primary regulator 68 to further reduce the pressure of the compressed gas 28 below the pressure provided therefrom. Different devices in the system 20 may be supplied by the compressed gas 28 at different pressures, which may be supplied by a combination of one or more primary regulators 68 and/or one or more secondary regulators 70. Alternatively, all of the devices in the system 20 that are configured to receive the compressed gas 28 may be supplied by the compressed gas 28 at the same pressure, which may be supplied by one or more primary regulators 68 and/or one or more secondary regulators 70.

The system 20 may include a first pressure chamber 72 operable at an elevated pressure. A first liquid fill valve 74 may control flow of the still product into the first pressure chamber 72 from the first still liquid conduit 62. A first check valve 76 may also be disposed in a fluid path between the first still liquid conduit 62 and the first pressure chamber 72 for allowing fluid flow into the first pressure chamber 72 and for blocking fluid flow out of the first pressure chamber 72 into the first still liquid conduit 62. A first level sensor 78 may be operably connected to the first pressure chamber 72 for sensing a first liquid level 80 in the first pressure chamber 72 being below a corresponding low operating level. A second level sensor 82 may also be operably connected to the first pressure chamber 72 for sensing the first liquid level 80 in the first pressure chamber 72 being at or above a corresponding high operating level. The first level sensor 78 and the second level sensor 82 may be combined into one device and may use one or more different methods of measuring the first liquid level 80 including, for example, radar, ultrasonic, tuning forks, float switches, or another method of measuring the level of a liquid. A first pressure gage 84 may be provided on the first pressure chamber 72 for indicating the pressure therein. A first pressure relief valve 86 in fluid communication with the first pressure chamber 72 may also be provided for opening to release fluid, such as a gas therefrom and thereby reduce the pressure therein. The first pressure relief valve 86 may function to allow air or another gas to enter the first pressure chamber 72 to facilitate draining the liquid contents therefrom. The first pressure relief valve 86 may also function as an over pressurization safety device to prevent the first pressure chamber 72 from being pressurized above a safe threshold pressure. A separate safety pressure relief valve (not shown in the figures) may be provided to prevent the first pressure chamber 72 from being pressurized above a safe threshold pressure.

A first gas diffuser 88 having a porous structure may be provided in the first pressure chamber 72 for diffusing the compressed gas 28 into the still product to produce a gas infused product. A first gas fill valve 92 may control the flow of the compressed gas 28 to the first gas diffuser 88 from the first gas conduit 32. A second check valve 94 may be disposed in a fluid path between the first gas conduit 32 and the first gas diffuser 88 for allowing the first gas to flow into the first gas diffuser 88 and for blocking fluid from flowing out of the first gas diffuser 88 into the first gas conduit 32.

The system 20 may include a second pressure chamber 96 operable at an elevated pressure. A second liquid fill valve 98 may control flow of the still product into the second pressure chamber 96 from the first still liquid conduit 62. A third check valve 100 may also be disposed in a fluid path between the first still liquid conduit 62 and the second pressure chamber 96 for allowing fluid flow into the second pressure chamber 96 and for blocking fluid flow out of the second pressure chamber 96 into the first still liquid conduit 62. A third level sensor 102 may be operably connected to the second pressure chamber 96 for sensing a second liquid level 104 in the second pressure chamber 96 being below a corresponding low operating level. A fourth level sensor 106 may also be operably connected to the second pressure chamber 96 for sensing the second liquid level 104 in the second pressure chamber 96 being at or above a corresponding high operating level. The third level sensor 102 and the fourth level sensor 106 may be combined into one device and may use one or more different methods of measuring the first liquid level 80 including, for example, radar, ultrasonic, tuning forks, float switches, or another method of measuring the level of a liquid. A second pressure gage 108 may be provided on the second pressure chamber 96 for indicating the pressure therein. A second pressure relief valve 110 in fluid communication with the second pressure chamber 96 may also be provided for opening to release fluid, such as a gas, therefrom and thereby reduce the pressure therein. The second pressure relief valve 110 may function to allow air or another gas to enter the second pressure chamber 96 to facilitate draining the liquid contents therefrom. The second pressure relief valve 110 may also function as an over-pressurization safety device to prevent the first pressure chamber 72 from being pressurized above a safe threshold pressure. A separate safety pressure relief valve may also be provided for that purpose. A separate safety pressure relief valve (not shown in the figures) may be provided to prevent the first pressure chamber 72 from being pressurized above a safe threshold pressure.

A second gas diffuser 112 having a porous structure may be provided in the second pressure chamber 96 for diffusing the compressed gas 28 into the still product to produce a gas infused product. A second gas fill valve 114 may control the flow of the compressed gas 28 to the second gas diffuser 112 from the first gas conduit 32. A fourth check valve 116 may be disposed in a fluid path between the first gas conduit 32 and the second gas diffuser 112 for allowing the first gas to flow into the second gas diffuser 112 and for blocking fluid from flowing out of the second gas diffuser 112 into the first gas conduit 32.

Any or all of the liquid fill valves 74, 98 and/or the gas fill valves 92, 114 and/or the pressure relief valves 86, 110 may be solenoid valves. Other types of valves may be used including, for example, ball valves or knife valves. A combination of valve types may be employed, such as, for example, ball valves for controlling the flow of liquids and solenoid valves for controlling the flow of the compressed gas 28. Relays and/or timing relays may be used to control the valves.

One or more of the gas diffusers 112, 88 may comprise one or more membranes. Alternatively, one or more of the gas diffusers 112, 88 may comprise a porous solid including stainless steel. The gas diffusers 112, 88 may be configured to diffuse said first gas to a maximum size of 50 microns, and preferably to a maximum size of 25 microns. More preferably, the gas diffusers 112, 88 may be configured to diffuse said first gas to a maximum size of 10 microns. The compressed gas 28 may any compressed gas or combination of compressed gasses, and may be, for example, a blend of different gasses from multiple sources (not shown in the figure). According to a preferred embodiment, the compressed gas 28 may consist essentially of Nitrogen with only trace amounts of impurities. The compressed gas 28 may alternatively include Carbon Dioxide or a mixture of Nitrogen and Carbon Dioxide.

A multi-way valve 118 may be provided in fluid communication with each of the pressure chambers 72, 96 for directing the gas infused product from a selected one of the pressure chambers 72, 96 to a first charged product conduit 120 and for blocking fluid from flowing from a non-selected one of the pressure chambers 72, 96. The multi-way valve 118 may comprise two or more 2-way valves which may be interlocked or configured such that only one of the valves allows fluid communication from a corresponding selected one of the pressure chambers 72, 96 to the first charged product conduit 120. The multi-way valve 118 may also be a special-purpose device that is configured with two or more input ports to accept two or more fluid conduits and to direct one of those input ports to one or more output ports at any given time.

The system 20 may include a blending valve 122 in fluid communication with the first still liquid conduit 62 and the first charged product conduit 120 for mixing the still product with the gas infused product and for supplying a still liquid dispenser 124 via a second still liquid conduit 126 and for supplying a charged liquid dispenser 128 via a second charged product conduit 130. The blending valve 122 may also function in conjunction with the mixing valves 36, 54 to as a bypass to allow a product to be dispensed which bypassed blending before and/or after being infused with the compressed gas 28. The still liquid dispenser may be any type of liquid dispenser including, for example, a beverage gun, a faucet, a tap, or another style of dispenser for liquids. The charged liquid dispenser 128 may be any type of liquid dispenser including, for example, a beverage gun, a faucet, a tap, a slow-flow "stout" type tap or another style of dispenser for liquids. A third pump 132 in fluid communication with the first still liquid conduit 62 may be provided to supply the blending valve 122 with the still product through a fifth liquid conduit 136. The system 20 may further include a fifth vessel 138 for holding a post-infusion ingredient 140 to be added into the gas infused product. A fourth pump 142 may be provided to pump the post-infusion ingredient 140 through a sixth liquid conduit 144 from the fifth vessel 138 to the blending valve 122. As shown in FIG. 1, the third pump 132 and/or the fourth pump 142 may be powered by a compressed gas 28 supplied by a third gas conduit 134, however, other types of pumps 132, 142, 30, 42 may be used such as electric or air-powered pumps 132, 142, 30, 42.

According to an aspect, the system 20 may include three or more pressure chambers 72, 96 with at least one being available at any given time to provide the gas infused product. Any number of two or more pressure chambers 72, 96 may be combined to scale for demand and to account for more time consuming impregnations due to fluid viscosity, desired gas, desired pressure, desired saturation, or any other variable that would affect the required impregnation time, temperature, and/or pressure. According to an aspect, the system 20 may allow the pressures to be varied over time, such as by incrementally adding the compressed gas 28 into the pressure chambers 72, 96 in stages or steps. This may be accomplished, for example, by using timed relays, electrical, mechanical, or computer control or other control mechanisms. The system 20 may also include two or more secondary regulators to step-up the pressure in the pressure chambers 72, 96 to different levels at scheduled time intervals. Some or all of the system 20 may be jacketed to allow for the circulation or activation of a heating or cooling medium for controlling the temperature of the various components, ingredients 140, 24, 40, 50, 58, and products, therein. According to another aspect, some or all of the system 20 may be encapsulated in a temperature controlled environment, such as a cooler or freezer.

The subject invention also includes a method for a gas impregnation of a liquid, which may include a combination of one or more of the following steps: pumping by a first pump 30 the first ingredient 24 from a first vessel 22 through a first liquid conduit 34 to a first mixing valve 36; pumping by a second pump 42 the second ingredient 40 from a second vessel 38 through a second liquid conduit 44 to the first mixing valve 36; supplying a compressed gas 28 through a second gas conduit 48 into a third vessel 46 to cause a third ingredient 50 to flow through a third liquid conduit 52 to a second mixing valve 54; supplying the compressed gas 28 through the second gas conduit 48 into a fourth vessel 56 to cause a fourth ingredient 58 to flow through a fourth liquid conduit 60 to the second mixing valve 54; and combining one or more of the first ingredient 24 the second ingredient 40 the third ingredient 50 and the fourth ingredient 58 by one or more of the first mixing valve 36, and the second mixing valve 54 to produce a still product within a first still liquid conduit 62. The method may proceed with the steps of: sensing by a first level sensor 78 a first liquid level 80 in a first pressure chamber 72 being below a corresponding low operating level; sensing by a second level sensor 82 the first liquid level 80 in the first pressure chamber 72 being at or above a corresponding high operating level; opening a first liquid fill valve 74 to fill the first pressure chamber 72 with a predetermined volume of the still product in response to a first liquid level 80 in the first pressure chamber 72 being below the low operating level; closing the first liquid fill valve 74 to cease filling the first pressure chamber 72 with the still product in response to the first liquid level 80 in the first pressure chamber 72 being at or above the high operating level.

The method may continue with the steps of: charging the first pressure chamber 72 by opening a first gas fill valve 92 with the first liquid level 80 in the first pressure chamber 72 being at or above the high operating level to cause the compressed gas 28 to flow through a first gas diffuser 88 and to infuse into the still product to produce a gas infused product in the first pressure chamber 72; closing the first gas fill valve 92 after a predetermined amount of the compressed gas 28 has infused into the gas infused product in the first pressure chamber 72; filling a second pressure chamber 96 with a predetermined volume of the still product by opening a second liquid fill valve 98 in response to a second liquid level 104 in the second pressure chamber 96 being below the operating level; closing the second liquid fill valve 98 to cease filling the second pressure chamber 96 with the still product in response to the second liquid level 104 in the second pressure chamber 96 being at or above the high operating level; charging the second pressure chamber 96 by opening a second gas fill valve 114 with the second liquid level 104 in the second pressure chamber 96 being at or above the high operating level to cause the compressed gas 28 to flow through a second gas diffuser 112 and to infuse into the still product to produce a gas infused product in the second pressure chamber 96; and closing the second gas fill valve 114 after a predetermined amount of the compressed gas 28 has infused into the gas infused product in the second pressure chamber 96. According to an aspect, the fill level setpoint, or the high operating level for filling the pressure chambers 72, 96 with the still product may be adjustable to meet the needs of the application and ideal saturations of the gas infused product and stability of the gas infused product over extended periods of time.

The steps of charging the pressure chambers 72 96, may require and/or be automatically be triggered after the respective one of the pressure chambers 72 96 is completed filling, which may occur upon the closing of the respective one of the liquid fill valves 74, 98.

The method may also include the steps of: directing by the multi-way valve 118 the gas infused product from an operational one of the pressure chambers 72, 96 into a first charged product conduit 120 to be discharged while blocking the flow of liquid from the other one of the pressure chambers 72, 96 to the first charged product conduit 120; switching by the multi-way valve 118 in response to the liquid level in the operational one of the pressure chambers 72, 96 having dropped below the associated low operating level and to cause the other one of the pressure chambers 72, 96 to be directed to the first charged product conduit 120, and thereby swapping the one of the pressure chambers 72, 96 functioning as the operational one of the pressure chambers 72, 96; and pumping by a third pump 132 the still product from the first still liquid conduit 62 to a blending valve 122. The method may further include the steps of: pumping by a fourth pump 142 a post-infusion ingredient 140 to be added into the gas infused product from a fifth vessel 138; mixing by the blending valve 122 one or more of the still product and the gas infused product and the post-infusion ingredient 140; supplying a still liquid dispenser 124 through a second still liquid conduit 126 with a still liquid from one or more of the second mixing valve 54 and the blending valve 122; and supplying a charged liquid dispenser 128 through an second charged product conduit 130 with a gas infused product from the blending valve 122. According to an aspect, the flow of the gas infused product is triggered by the opening or activation of the charged liquid dispenser 128.

The method may further include one or more of the steps of: determining when the predetermined amount of the compressed gas 28 has infused into the gas infused product which may be, for example, by detecting a change in the mass or the pressure of the contents of the first pressure chamber 72; and determining when the predetermined amount of the compressed gas 28 has infused into the gas infused product, which may be, for example, by detecting a change in the mass or the pressure of the contents of the second pressure chamber 96. Alternatively, the method may further include one or more of the steps of closing the first gas fill valve 92 a predetermined amount of time after opening the first gas fill valve 92; and 252 closing the second gas fill valve 114 after a predetermined amount time after opening the second gas fill valve 114. The predetermined amounts of time may be controlled by, for example, timing relays or a digital controller such as a stand-alone device or as part of a larger control system. When using pressure differentials to determine the liquid level or the ratio of headspace to liquid, a measure of the compressed gas 28 may be introduced into the pressure chambers 72, 96 prior to filling the corresponding one of the pressure chambers 72, 96 prior to filling with the still product.

According to an aspect, only the non-operational one of the pressure chambers 72, 96, which is blocked from fluid communication with the first charged product conduit 120, is permitted to open its respective fill valves 114, 74, 92, 98. According to another aspect, the operational one of the pressure chambers 72, 96 is available to supply the gas infused product while the non-operational one of the pressure chambers 72, 96 is being filled and charged.

According to another aspect, the volume of the liquid in the pressure chambers 72, 96 may be adjustable to allow for on-demand production of the gas infused product. This may allow, for example, the volume of liquid in the pressure chambers 72, 96 to be as small as one dose or serving of the gas infused product. The pressure chambers 72, 96 could be configured as simple lengths of pipe, line, or hose, provided that they are capable of safely containing the pressures required.

Obviously, many modifications and variations of the present invention are possible in light of the above teachings and may be practiced otherwise than as specifically described while within the scope of the appended claims. In addition, the reference numerals in the claims are merely for convenience and are not to be read in any way as limiting.

What is claimed is:

1. A system for gas impregnation of a liquid and comprising:
   a container for holding a product ingredient;
   a first still liquid conduit in fluid communication with the container for conveying a still product including said product ingredient to each of a first pressure chamber and a second pressure chamber;
   a gas cylinder providing a gas conduit with a compressed gas;
   the first pressure chamber containing a first gas diffuser in fluid communication with said gas conduit and having a porous structure for diffusing said compressed gas into the still product to produce a gas infused product;
   the second pressure chamber containing a second gas diffuser in fluid communication with said gas conduit and having a porous structure for diffusing said compressed gas into said still product to produce said gas infused product;
   a multi-way valve in fluid communication with each of said pressure chambers for directing said gas infused product from a selected one of said pressure chambers to a first charged product conduit for supplying a charged liquid dispenser, and for blocking the still product or the gas infused product from flowing from a non-selected one of said pressure chambers.

2. The system for gas impregnation of a liquid as set forth in claim 1 further including a first liquid fill valve controlling flow of said still product from said first still liquid conduit into said first pressure chamber; and
   a second liquid fill valve controlling flow of said still product from said first still liquid conduit into said second pressure chamber.

3. The system for gas impregnation of a liquid as set forth in claim 1 wherein at least one of said first gas diffuser or said second gas diffuser comprises a membrane.

4. The system for gas impregnation of a liquid as set forth in claim 1 wherein at least one of said first gas diffuser or said second gas diffuser comprises a porous solid including stainless steel.

5. The system for gas impregnation of a liquid as set forth in claim 1 wherein each of said diffusers is configured to diffuse said first gas to a maximum size of 25 microns.

6. The system for gas impregnation of a liquid as set forth in claim 1 wherein each of said diffusers is configured to diffuse said first gas to a maximum size of 10 microns.

7. The system for gas impregnation of a liquid as set forth in claim 1 further including a still liquid dispenser in fluid communication with at least one of a blending valve in fluid communication with said first still liquid conduit or a mixing valve in fluid communication with said first still liquid conduit for dispensing a still liquid not infused with said compressed gas.

8. The system for gas impregnation of a liquid as set forth in claim 1 wherein said compressed gas includes Nitrogen.

9. The system for gas impregnation of a liquid as set forth in claim 1 further including a temperature control apparatus for heating or for cooling at least one of said ingredient or said still product or said gas infused product.

10. The system for gas impregnation of a liquid as set forth in claim 1 further including a blending valve in fluid communication with said first charged product conduit and for supplying said charged liquid dispenser through a second charged product conduit and for combining said gas infused product with one or more other ingredients.

11. The system for gas impregnation of a liquid as set forth in claim 10 wherein said blending valve is in fluid communication with a vessel holding a post-infusion ingredient for combining said post-infusion ingredient with said gas infused product prior to dispensing.

12. The system for gas impregnation of a liquid as set forth in claim 10 wherein said blending valve is in fluid communication with said first still liquid conduit and said first charged product conduit for combining said still product with said gas infused product.

13. The system for gas impregnation of a liquid as set forth in claim 1, wherein said first still liquid conduit is one of a plurality of liquid conduits; and
   wherein said system further includes a jacket surrounding one of the plurality of liquid conduits for circulating a fluid to control the temperature of the contents of the one of the plurality of liquid conduits.

14. A method for gas impregnation of a liquid including:
   filling a first pressure chamber with a predetermined volume of a still product;
   charging the first pressure chamber by opening a first gas fill valve to cause a compressed gas to flow through a first gas diffuser and to infuse into the still product to produce a gas infused product in the first pressure chamber;
   filling a second pressure chamber with a predetermined volume of the still product;
   charging the second pressure chamber by opening a second gas fill valve to cause the compressed gas to flow through a second gas diffuser and to infuse into the still product to produce a gas infused product in the second pressure chamber;
   directing by a multi-way valve the gas infused product from an operational one of the pressure chambers into a first charged product conduit to be discharged while blocking the flow of the still product or the gas infused product from the other one of the pressure chambers to the first charged product conduit;
   switching by the multi-way valve to cause a different one of the pressure chambers to be directed to the first charged product conduit, and thereby swapping the one of the pressure chambers functioning as the operational one of the pressure chambers; and
   wherein only the non-operational one of the pressure chambers which is blocked from fluid communication with the first charged product conduit is permitted to open its respective fill valves, and wherein the operational one of the pressure chambers is available to supply the gas infused product while the non-operational one of the pressure chambers is being filled and charged;
   supplying a charged liquid dispenser with the gas infused product from the multi-way valve.

15. The method for gas impregnation of a liquid as set forth in claim 14 wherein the step of switching by the multi-way valve is done in response to the liquid level in the operational one of the pressure chambers having dropped below an associated low operating level.

16. The method for gas impregnation of a liquid as set forth in claim 14 wherein only the non-operational one of the pressure chambers which is blocked from fluid communication with the first charged product conduit is permitted to open its respective fill valve, and wherein the operational one of the pressure chambers is available to supply the gas infused product while the non-operational one of the pressure chambers is being filled and charged.

17. The method for gas impregnation of a liquid as set forth in claim 14 wherein the step of filling the first pressure chamber with the predetermined volume of the still product further includes opening a first liquid fill valve to fill the first pressure chamber with the predetermined volume of the still product, and closing the first liquid fill valve to cease filling the first pressure chamber with the still product; and wherein the step of filling the second pressure chamber with the predetermined volume of the still product further includes opening a second liquid fill valve to fill the second pressure chamber with the predetermined volume of the still product, and closing the second liquid fill valve to cease filling the second pressure chamber with the still product.

18. The method for gas impregnation of a liquid as set forth in claim 17 further including the steps of:

closing the first liquid fill valve to cease filling the first pressure chamber with the still product in response to a liquid level in the first pressure chamber being at or above a high operating level; and closing the second liquid fill valve to cease filling the second pressure chamber with the still product in response to a liquid level in the second pressure chamber being at or above the high operating level.

19. The method for gas impregnation of a liquid as set forth in claim 14 further including the steps of:

closing the first gas fill valve after a predetermined amount of the compressed gas has infused into the gas infused product in the first pressure chamber; and closing the second gas fill valve after a predetermined amount of the compressed gas has infused into the gas infused product in the second pressure chamber.

20. The method for gas impregnation of a liquid as set forth in claim 19 wherein the step of closing the first gas fill valve after a predetermined amount of the compressed gas has infused into the gas infused product in the first pressure chamber further includes determining when the predetermined amount of the compressed gas has infused into the gas infused product; and wherein the step of closing the second gas fill valve after a predetermined amount of the compressed gas has infused into the gas infused product in the second pressure chamber further includes determining when the predetermined amount of the compressed gas has infused into the gas infused product.

21. The method for gas impregnation of a liquid as set forth in claim 14 further including the steps of:

closing the first gas fill valve a predetermined amount of time after opening the first gas fill valve; and closing the second gas fill valve after a predetermined amount time after opening the second gas fill valve.

22. A method for a gas impregnation of a liquid including:

pumping by a first pump a first ingredient from a first vessel through a first liquid conduit to a first mixing valve;

pumping by a second pump a second ingredient from a second vessel through a second liquid conduit to the first mixing valve;

supplying a compressed gas through a gas conduit into a third vessel to cause a third ingredient to flow through a third liquid conduit to a second mixing valve;

supplying the compressed gas through the gas conduit into a fourth vessel to cause a fourth ingredient to flow through a fourth liquid conduit to the second mixing valve;

combining one or more of the first ingredient and the second ingredient and the third ingredient and the fourth ingredient by one or more of the first mixing valve and the second mixing valve to produce a still product within a first still liquid conduit;

sensing by a first level sensor a liquid level in a first pressure chamber being below a low operating level associated with the first pressure chamber;

sensing by a second level sensor the liquid level in the first pressure chamber being at or above a high operating level associated with the first pressure chamber;

opening a first liquid fill valve to fill the first pressure chamber with a predetermined volume of the still product from the first still liquid conduit in response to the liquid level in the first pressure chamber being below the low operating level associated with the first pressure chamber;

closing the first liquid fill valve to cease filling the first pressure chamber with the still product in response to the liquid level in the first pressure chamber being at or above the high operating level associated with the first pressure chamber;

charging the first pressure chamber by opening a first gas fill valve with the liquid level in the first pressure chamber being at or above the high operating level associated with the first pressure chamber to cause the compressed gas to flow through a first gas diffuser and to infuse into the still product to produce a gas infused product in the first pressure chamber;

closing the first gas fill valve after a predetermined amount of the compressed gas has infused into the gas infused product in the first pressure chamber;

filling a second pressure chamber with a predetermined volume of the still product from the first still liquid conduit by opening a second liquid fill valve in response to a liquid level in the second pressure chamber being below a low operating level associated with the second pressure chamber;

closing the second liquid fill valve to cease filling the second pressure chamber with the still product in response to the liquid level in the second pressure chamber being at or above a high operating level associated with the second pressure chamber;

charging the second pressure chamber by opening a second gas fill valve with the liquid level in the second pressure chamber being at or above the high operating level associated with the second pressure chamber to cause the compressed gas to flow through a second gas diffuser and to infuse into the still product to produce a gas infused product in the second pressure chamber;

closing the second gas fill valve after a predetermined amount of the compressed gas has infused into the gas infused product in the second pressure chamber;

directing by a multi-way valve the gas infused product from an operational one of the pressure chambers into a first charged product conduit to be discharged while blocking the flow of liquid from the other one of the pressure chambers to the first charged product conduit;

switching by the multi-way valve in response to the liquid level in the operational one of the pressure chambers having dropped below the low operating level associated with the operational one of the pressure chambers and to cause the other one of the pressure chambers to be directed to the first charged product conduit, and thereby swapping the one of the pressure chambers functioning as the operational one of the pressure chambers;

wherein only the non-operational one of the pressure chambers, which is blocked from liquid communication with the first charged product conduit, is permitted to open its respective gas fill valve or its respective liquid fill valve, and wherein the operational one of the pressure chambers is available to supply the gas infused product while the non-operational one of the pressure chambers is being filled and charged;

pumping by a third pump the still product from the first still liquid conduit to a blending valve;

pumping by a fourth pump a post-infusion ingredient to be added into said gas infused product from a fifth vessel;

mixing by the blending valve one or more of the still product and the gas infused product and the post-infusion ingredient;

supplying a still liquid dispenser through a second still liquid conduit with a still liquid from one or more of the second mixing valve and the blending valve;

supplying a charged liquid dispenser through a second charged product conduit with a gas infused product from the blending valve.

* * * * *